Figure 1:
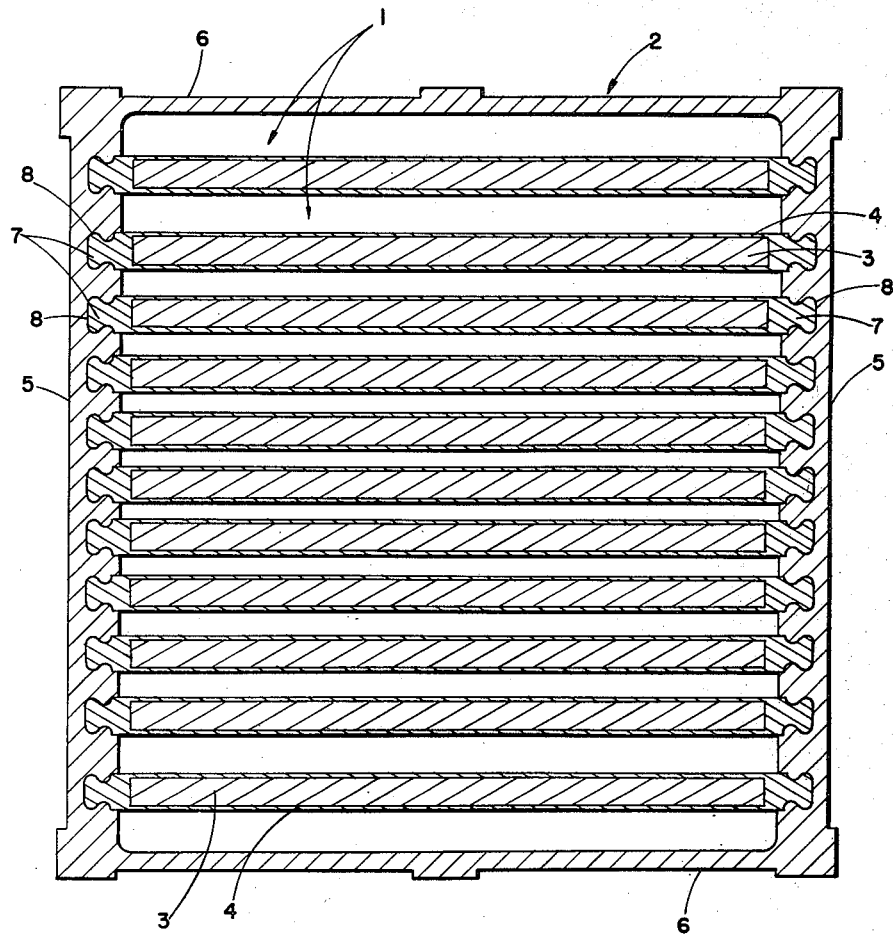

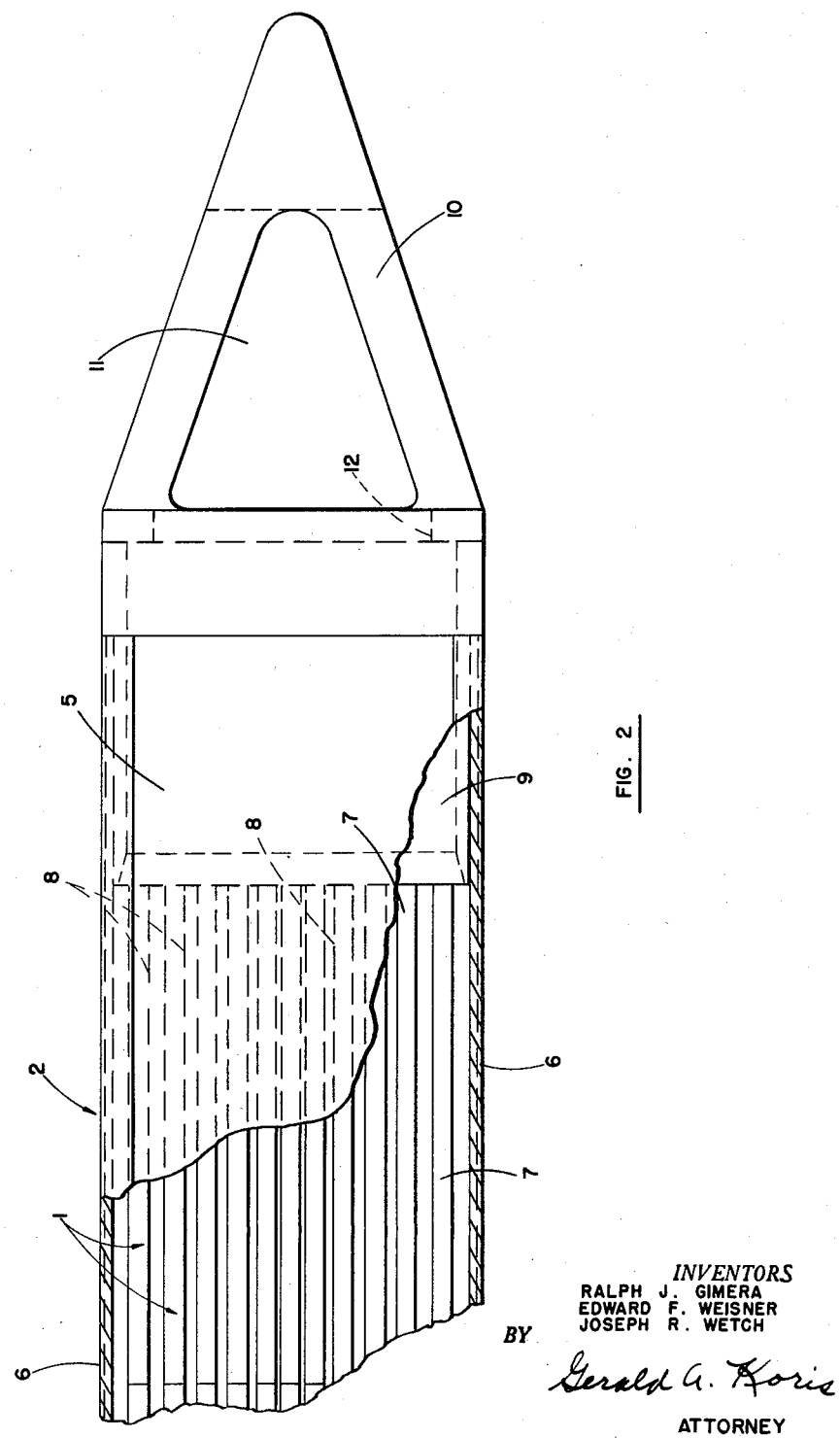

United States Patent Office 2,947,678
Patented Aug. 2, 1960

2,947,678

VARIABLE-SPACED NUCLEAR REACTOR FUEL ASSEMBLY

Ralph J. Gimera, Edward F. Weisner, and Joseph R. Wetch, Woodland Hills, Calif., assignors to North American Aviation, Inc.

Filed Dec. 18, 1956, Ser. No. 629,149

7 Claims. (Cl. 204—193.2)

Our invention relates to an improved nuclear reactor fuel element, and more particularly to an improved plate-type fuel element.

For information concerning the theory, construction and operation of nuclear reactors, reference is made to U.S. Patents 2,708,656 and 2,714,577 to Fermi et al.; Glasstone, "Principles of Nuclear Reactor Engineering" (D. Van Nostrand Co.); Schultz, "The Control of Nuclear Reactors" (McGraw-Hill); "The Reactor Handbook" (3 volumes), published by the U.S. Atomic Energy Commission; and to "The Proceedings of the International Conference on the Peaceful Uses of Atomic Energy," held in Geneva, Switzerland, August 1955, and available for sale at the United Nations Book Store, New York, New York.

For information concerning the fabrication of plate or MTR-type fuel elements, attention is invited to the Geneva Conference paper of J. E. Cunningham and E. J. Boyle entitled "MTR-type Fuel Elements." For information concerning water-cooled reactors which employ this type of fuel element, see the Geneva Conference paper of A. M. Weinberg et al. entitled "The Materials Testing Reactor and Related Research Reactors."

As shown in the Cunningham paper, the typical plate-type fuel element comprises a plurality of long, slightly curved or flat plates, each plate comprising a core of uranium-aluminum alloy and a thin cladding of aluminum metal, resulting in a sandwich-type of construction. The cladding is used to retain fission products within the fuel and to protect the uranium from corrosion or other damage by the coolant, typically water. The plates are assembled into a hollow, rectangular, box-like frame to form a composite fuel element. The plates in each assembly are spaced equidistant. Due to the disadvantage factor i.e., drop off of thermal neutron flux from the edge to the center of the fuel element from a self-shielding effect), the central plates experience a lower fission rate and hence produce less heat. However, the coolant flow rate through each of the channels in the fuel element is substantially equal, the flow rate being determined by the heat production of the hotter, outer plates of the element. This requires a higher pumping rate than necessary for a given power output, a lower bulk temperature rise, and excessive cooling of the inner plates, which may cause thermal stress problems. To offset this, attempts have been made in some reactors to use fuel plates of varying fuel enrichment and/or plates of different thicknesses. This, of course, creates handling and fabricational problems and is generally quite undesirable.

The foregoing problems are especially severe in reactors cooled with organic reagents such as polyphenyls. The temperature gradients across the fuel element can be very large due to the relatively poor heat transfer properties of organic media. There may typically be a ΔT of several hundred ° F. from a fuel plate across the surface film to the bulk coolant. Thus, a non-uniform power distribution across the fuel plates can produce large variation in fuel plate temperature across the box assembly. The resulting thermal stresses can be sufficient to warp a fuel assembly, causing dangerous hot spots, or may even lead to the rupture of an element. Therefore, a flux pattern across a fuel element that can be tolerated with a water-cooled reactor could be intolerable in an organic-cooled reactor, and a new approach to the fuel element design must be sought. It would be desirable, however, to retain the plate-type fuel element since it provides a high surface-to-volume ratio for good heat transfer across the plate at elevated temperatures.

In the typical plate-type fuel element, the plates are squared off at their ends and fit into longitudinal slots or grooves, and are fastened thereto by either welding or brazing. Welding or brazing undesirably increases fabricational costs, may cause distortions in the element, and may introduce trace amounts of impurities having high thermal neutron absorption cross-sections, thus affecting the neutron economy of the system. Furthermore, in the event of differential thermal expansion of the fuel plates and the frame, bowing or other distortions might occur which would adversely affect heat transfer. This would be expected to be a real problem in an organic-cooler reactor.

In view of the shortcomings of the present plate-type fuel element, an object of our present invention is to provide an improved plate-type fuel assembly.

Another object is to provide such an element in which cooling of the plates is proportional to their heat generation rates, thereby reducing thermal stress problems.

Another object is to provide such an element which permits a reduction in coolant flow volume and diminishes pumping requirements.

Another object is to provide such a fuel element having physical integrity without welding or brazing of the fuel plates.

Yet another object is to provide engaging means for holding flat plates in a fuel element without welding or brazing.

Further objects and advantages of our invention will become apparent from the following detailed description, taken together with the appended claims and the accompanying drawings.

In the drawings, Figure 1 represents a cross-section of our fuel element, and Figure 2 is a side elevation, partly in section.

Referring now to Figure 1, the fuel plates 1 are assembled such that the inner plates are closer together than the outer plates. The distance between the plates increases as we go from the center plate to the outer plates, the spaces being apportioned according to the heat generation rate in the plates. Since the fuel plates towards the center of the fuel element require less cooling than plates toward the outer edge, the present variable spacing provides equal cooling of all the plates when there is a uniform pressure difference across the end of the element. The variable spacing achieves a reduction in the coolant flow rate through the center plates. This results in all the plates being at approximately the same temperature and the net flow rate can be reduced for a given power output, resulting in a higher bulk temperature rise and less pumping power. Considerable economic benefits are thereby obtained. Furthermore, the present variable plate spacing improves the temperature distribution throughout the element and greatly decreases the possibilities of stresses which would cause distortion, hot spots or total failure of the fuel element.

Further improvement of this type can be realized by varying the coolant annulus in the other direction (parallel to the plates). This is done by either varying the cladding thickness so as to be thicker in the center and thinner on the outer ends of each plate, or by varying the thickness of the uranium so as to be thicker towards the center (or a combination of the two). However, the plates as shown are an excellent practical solution to the problem. All the plates can then be manufactured of one type, affording considerable fabricational economies and handling ease, and then merely inserted into the side plates with variable-spaced slots for receiving the plates.

Considering now the construction details of the fuel element shown in Figure 1, the element comprises a plurality of flat plates 1, supported in a hollow, rectangular frame 2. Fuel plate 1 comprises a central core 3 of fissionable material. The fuel comprises one of the thermal-neutron fissile isotopes (U–233, U–235 and Pu) in the form of metal, oxide, carbide, nitride, alloy, such as uranium-aluminum alloy, or sintered compacts such as $UO_2$+ stainless steel. The core 3 is clad with a metal 4 of suitable metallurgical and nuclear properties (i.e., relatively low thermal neutron absorption cross-section) to protect the fuel from the coolant and to retain fission products within the plate. Suitable cladding materials include aluminum, magnesium, zirconium, stainless steel, and various alloys. The cladding is applied by conventional methods, such as hot and cold pressing to form a metallurgical bond between core 3 and cladding 4. The frame 2 consists of side plates 5 which engage and hold fuel plates 1 and non-fuel containing end plates 6 parallel to fuel plates 1. The frame 2 can be very conveniently extruded in the form shown. The frame may also be machined and welded. The plates 1 have dove-tail end pieces 7, made by extrusion or machining, which fit into corresponding slots 8 of side plates 5. The illustrated or similar holding means prevent substantial vertical or lateral motion of the fuel plates. Such locking means supplant brazing or welding for engaging fuel plates into the side plates 5, thereby simplifying construction of the element. A major technical benefit of this holding arrangement is that distortions which might otherwise result in organic-cooled reactors from differential expansion of fuel and side plates are prevented. If so desired, however, the variable-spaced plates may also be welded or brazed (e.g., with an Al-Si braze, 11–13 wt. percent Si) with regular squared-off end pieces and receiving slots.

Referring now to Figure 2, it is seen that fuel plates 1 terminate against an end box 9. This arrangement prevents the fuel plates from sliding out of the fuel assembly. Side plates 5 and end plates 6 extend along the perimeter of box 9 and are welded or brazed thereto by standard methods. A similar arrangement is used at the top of the fuel element. An insertion guide 10 is attached to end box 9 for the purpose of inserting the fuel element in a vertical position into the grid plate of an MTR-type core. End box 9 and insertion guide 10, of the same structural material as frame 2, may be cast as a unit. Insertion guide 10 defines an orifice 11 for coolant passage into the fuel element through orifice 12 in end box 9. In place of end box 9, the plates may be held in the frame by a pin or other such means.

The following example is offered to illustrate the use of the element shown in the drawings in an organic moderated reactor such as shown in the co-pending application of the common assignee, S.N. 586,840, filed May 23, 1956, in the names of J. R. Wetch et al., for "Organic Reactor."

*Example*

| Fuel element: | |
|---|---|
| Plates per fuel element | 11. |
| Plate spacing (from central plate to end plates), inches | 0.096, 0.099, 0.105, 0.115, 0.130, 0.135. |
| Fuel | U metal—1.6% enriched in U–235, 0.5 mil Ni plated. |
| Cladding and side plates | Aluminum. |
| Size of fuel element lattice, inches | 4 x 4. |
| Inside dimension of fuel element, inches | 2.96 x 2.6. |
| Thickness of fuel plate, inches | 0.100. |
| Thickness of cladding, each side, inches | 0.020. |
| Active width of fuel in each plate, inches | 2.5. |
| Length of fuel element, inches | 72. |
| Number of fuel elements | 257. |
| Reactor heat transfer conditions: | |
| Coolant | Terphenyl, isomeric mixture, M.P.~200° F. |
| Maximum bulk coolant velocity between fuel plates, ft./sec | 15. |
| Inlet coolant temperature, ° F | 575. |
| Maximum fuel plate surface temperature, ° F | 750. |
| Reactor total thermal power, Mw | 80. |
| Fraction of total heat generated in fuel plates | .91. |
| Fraction of total flow through moderator region | .06. |
| Core flow is throttled in the radial direction to give equal bulk outlet temperatures from the elements. | |
| Hot channel factors:[1] | |
| Applied to coolant temperature rise | 1.145. |
| Applied to film temperature drop | 1.370. |
| Physical properties of terphenyl: | |
| Density, lb./ft.$^3$ | 53.3. |
| Specific heat, B.t.u./lb., ° F | 0.611. |
| Thermal conductivity, B.t.u./hr.-ft., ° F | 0.0562. |
| Absolute viscosity, lb./ft.-hr. | 0.786. |
| Maximum film heat transfer coefficient, B.t.u./hr.-ft.$^2$, ° F | 1066. |
| Maximum heat flux, B.t.u./hr.-ft.$^2$ | 117,000. |
| Required fuel plate heat transfer surface, ft.$^2$ | 7,350. |
| Average heat flux, B.t.u./hr.-ft.$^2$ | 33,800. |
| Bulk outlet temperature from reactor, ° F | 622. |
| Total flow rate through reactor, g.p.m | 22,260. |
| Friction pressure drop in core, p.s.i. | 6.9. |

[1] A factor for the tolerance on the coolant space is not included in these factors because the effect of a smaller than normal space is taken care of by the heat transfer equations.

The above example is merely illustrative and not restrictive of our invention, which is inherently very broad. It is expected that those skilled in the art can replace the indicated dove-tails with other suitable physical holding means. Therefore, our invention should be understood to be limited only as is indicated by the appended claims.

Having thus described our invention, we claim:

1. A nuclear reactor fuel element comprising a plurality of spaced fuel plates, supporting means for said plates, the spaces between said fuel plates increasing with the flux level in said plates.

2. A nuclear reactor fuel element comprising a plurality of parallel, spaced fuel plates positioned in a supporting frame, the space between each of said plates increasing laterally from the center to the edge of said fuel element.

3. The fuel element of claim 2, wherein said plates are held in said assembly by physical holding means.

4. A nuclear reactor fuel element comprising a plurality of parallel, spaced fuel plates, a hollow, rectangular supporting assembly, said fuel plates being positioned non-rigidly and longitudinally in said supporting assembly, the distance between adjacent, succeeding plates increasing laterally from the center to the edges of said fuel element.

5. The fuel element of claim 4, wherein said fuel plates comprising a central core of thermal neutron-fissile material and a cladding metallurgically bonded to said core, said cladding and said supporting assembly being of a chemically compatible, a corrosion-resistant metal of relatively low thermal neutron absorption cross section.

6. The fuel element of claim 5, wherein said fissile material is selected from the group consisting of the metals, carbides, nitrides, oxides, alloys of uranium and plutonium and $UO_2$-stainless steel sintered compact, and said cladding and said supporting assembly metal is selected from the group consisting of aluminum, magnesium, zirconium, and stainless steel.

7. A nuclear fuel element comprising a plurality of variable-spaced, flat, parallel, aluminum-clad fuel plates, each fuel plate comprising a core of uranium dioxide and aluminum and a cladding of aluminum metallurgically bonded to said core, a hollow, rectangular, aluminum supporting assembly, said fuel plates being positioned non-rigidly and longitudinally in said supporting assembly, the spacing between adjacent succeeding plates increasing laterally from the center to the edge of said fuel element.

References Cited in the file of this patent

UNITED STATES PATENTS

Re. 2,297   Robbins _____ June 26, 1866

OTHER REFERENCES

U.S. Atomic Energy Commission AECD-3840, J. R. Dietrich et al., February 1954, pages 15, 49, 75, 103. Available AEC Technical Information Service, Oak Ridge, Tenn.

Glasstone: "Principle of Nuclear Reactor Engineering," D. Van Nostrand Co., Inc., Princeton, New Jersey (1955), pages 763–766.

Sylvania Technologist, vol. IX, No. 1, January 1956, page 2.